(12) United States Patent
Niikuni et al.

(10) Patent No.: US 10,940,822 B2
(45) Date of Patent: Mar. 9, 2021

(54) VEHICLE SEAT STRUCTURE

(71) Applicant: TOYOTA JIDOSHA KABUSHIKI KAISHA, Toyota (JP)

(72) Inventors: Hiroshi Niikuni, Miyoshi (JP); Kenichiro Koshizako, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 89 days.

(21) Appl. No.: 16/257,708

(22) Filed: Jan. 25, 2019

(65) Prior Publication Data

US 2019/0291679 A1 Sep. 26, 2019

(30) Foreign Application Priority Data

Mar. 22, 2018 (JP) .............................. JP2018-053926

(51) Int. Cl.
*B60R 21/207* (2006.01)
*B60N 2/809* (2018.01)
*B60N 2/14* (2006.01)
*B60R 21/00* (2006.01)

(52) U.S. Cl.
CPC ............ *B60R 21/207* (2013.01); *B60N 2/143* (2013.01); *B60N 2/809* (2018.02); *B60R 2021/0004* (2013.01); *B60R 2021/0011* (2013.01); *B60R 2021/0048* (2013.01); *B60R 2021/2074* (2013.01)

(58) Field of Classification Search
CPC ...... B60N 2002/022; B60R 2021/2074; B60R 2021/0058
See application file for complete search history.

(56) References Cited

U.S. PATENT DOCUMENTS

| 2005/0006941 | A1* | 1/2005 | Park | B60N 2/885 |
| | | | | 297/406 |
| 2016/0052477 | A1 | 2/2016 | Tobata et al. | |
| 2016/0082915 | A1* | 3/2016 | Madaras | B60R 21/231 |
| | | | | 297/216.2 |
| 2016/0272141 | A1* | 9/2016 | Ohmura | B60R 21/0134 |
| 2017/0267205 | A1* | 9/2017 | Numazawa | B60N 2/143 |
| 2017/0291569 | A1* | 10/2017 | Sugie | B60R 21/2338 |

(Continued)

FOREIGN PATENT DOCUMENTS

| JP | 2009-056836 A | 3/2009 |
| JP | 2016-043813 A | 4/2016 |

(Continued)

*Primary Examiner* — James A English
(74) *Attorney, Agent, or Firm* — Oliff PLC

(57) ABSTRACT

A vehicle seat structure that includes: a seatback that is provided at a seat rear side of a seat cushion so as to be able to tilt in a seat front-rear direction with respect to the seat cushion, and that can support an upper body of a vehicle occupant; a headrest that is provided at a side of the seatback, which side is opposite from a side at which the seat cushion is located, and that can support a head portion of the vehicle occupant; and shoulder restraining portions that are provided at the headrest or at the headrest side of the seatback, and that, by protruding out toward a vehicle occupant side at a time of an emergency of a vehicle, restrain both shoulders of the vehicle occupant in a case in which the vehicle occupant has moved along the seatback toward the headrest side.

8 Claims, 4 Drawing Sheets

(56) References Cited

U.S. PATENT DOCUMENTS

| | | | |
|---|---|---|---|
| 2018/0186324 A1* | 7/2018 | Faruque | B60R 22/12 |
| 2019/0031132 A1* | 1/2019 | Dry | B60R 21/207 |
| 2019/0054884 A1* | 2/2019 | Dry | B60R 21/2338 |
| 2019/0071046 A1* | 3/2019 | Dry | B60R 21/207 |
| 2019/0217805 A1* | 7/2019 | Dry | B60N 2/14 |
| 2019/0225184 A1* | 7/2019 | Ohno | B60N 2/00 |
| 2020/0047770 A1* | 2/2020 | Ozawa | B60N 2/002 |

FOREIGN PATENT DOCUMENTS

| | | |
|---|---|---|
| JP | 2016-190593 A | 11/2016 |
| JP | 2016-190594 A | 11/2016 |
| JP | 2016-190595 A | 11/2016 |
| JP | 2016-190596 A | 11/2016 |
| JP | 2017-065298 A | 4/2017 |

\* cited by examiner

VEHICLE SEAT STRUCTURE

CROSS-REFERENCE TO RELATED APPLICATION

This application is based on and claims priority under 35 USC 119 from Japanese Patent Application No. 2018-053926 filed on Mar. 22, 2018, the disclosure of which is incorporated by reference herein.

BACKGROUND

Technical Field

The present disclosure relates to a vehicle seat structure.

Related Art

Japanese Patent Application Laid-Open (JP-A) No. 2017-65298 discloses a vehicle occupant protecting device that, in a case in which a vehicle receives impact from the rear, can prevent the head portion of a vehicle occupant who is seated in a vehicle seat from contacting members that structure the vehicle occupant cabin. The vehicle occupant protecting device disclosed in JP-A No. 2017-65298 is structured to include a first airbag that expands from the seat, and a second airbag that expands from the ceiling. The first airbag pushes the collarbone region, the rib region, and the humeral regions of the vehicle occupant, and the second airbag supports the first airbag. Due thereto, the upper body of the vehicle occupant who is seated in the vehicle seat is prevented from riding-up along the seatback, and the head portion of the vehicle occupant is prevented from contacting members that structure the vehicle occupant cabin.

By the way, at a vehicle seat at which the orientation of the seat can be changed from a state of facing toward the frontward side of the vehicle, it is desirable to be able to prevent or suppress the upper body of a vehicle occupant who is seated in a vehicle seat from riding-up along the seatback at the time of a collision, regardless of the orientation of the seat. However, it is difficult to address such a need in the structure disclosed in JP-A No. 2017-65298.

SUMMARY

A vehicle seat structure of an aspect of the present disclosure includes: a seat cushion that can support buttocks and femoral regions of a vehicle occupant; a rotating mechanism that supports the seat cushion such that the seat cushion can rotate with a vehicle vertical direction as an axis; a seatback that is provided at a seat rear side of the seat cushion so as to be able to tilt in a seat front-rear direction with respect to the seat cushion, and that can support an upper body of the vehicle occupant; a headrest that is provided at a side of the seatback, which side is opposite from a side at which the seat cushion is located, and that can support a head portion of the vehicle occupant; and shoulder restraining portions that are provided at the headrest or at the headrest side of the seatback, and that, by protruding out toward a vehicle occupant side at a time of an emergency of a vehicle, restrain both shoulders of the vehicle occupant in a case in which the vehicle occupant has moved along the seatback toward the headrest side.

BRIEF DESCRIPTION OF DRAWINGS

Exemplary embodiments of the present disclosure will be described in detail based on the following figures, wherein.

DETAILED DESCRIPTION

Figure 1:
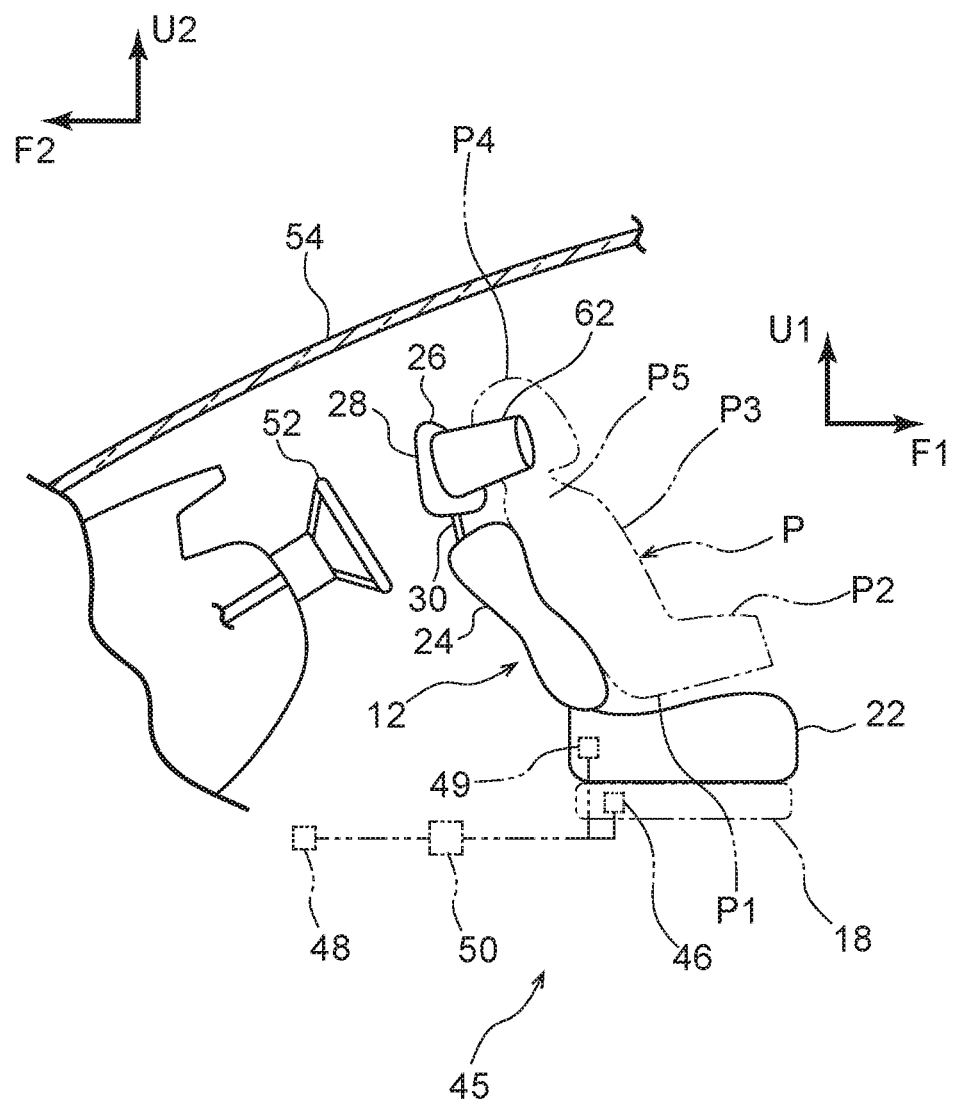
FIG. 1 is a side view schematically showing a cabin that is equipped with a vehicle seat to which a vehicle seat structure of a present embodiment is applied.

A vehicle seat structure relating to an embodiment of the present disclosure is described by using FIG. 1 through FIG. 4. Note that arrow F1 that is shown appropriately in the respective drawings indicates the seat forward direction, arrow U1 indicates the seat upward direction, arrow R1 indicates the seat rightward direction, and arrow L1 indicates the seat leftward direction. These respective directions correspond to the respective directions that are seen from a vehicle occupant who is seated in the vehicle seat. Further, arrow F2 that is shown in FIG. 1 indicates the frontward direction of the vehicle, arrow U2 indicates the upward direction of the vehicle, arrow R2 indicates the rightward direction of the vehicle, and arrow L2 indicates the leftward direction of the vehicle.

As shown in FIG. 1, a vehicle seat 12, to which the vehicle seat structure of the present embodiment is applied, has a seat cushion 22 that supports buttocks P1 and femoral regions P2 of a vehicle occupant P, and a seatback 24 that supports an upper body P3 of the vehicle occupant P. Further, the vehicle seat 12 has a headrest 26 that supports a head portion P4 of the vehicle occupant P.

The seat cushion 22 is structured by a seat cushion pad that is covered by a skin material being mounted to a seat cushion frame, or the like. The seat cushion 22 is supported by a rotating mechanism 18 via seat rails that cause the seat cushion 22 to slide in the seat front-rear direction. The rotating mechanism 18 supports the seat cushion 22 (the vehicle seat 12) rotatably with the seat vertical direction being the axial direction. Due to this rotating mechanism 18 being operated electrically or manually, the rotating mechanism 18 can rotate the vehicle seat 12. Further, the rotating mechanism 18 has a rotation locking portion that locks the rotation of the vehicle seat 12. Due to the rotating mechanism 18 having this rotation locking portion, the orientation of the vehicle seat 12 can be maintained at a predetermined position. As an example, in the present embodiment, the vehicle seat 12 can be maintained by the rotation locking portion in a state, in which the seat front side of the vehicle seat 12 faces toward the vehicle frontward side, and a state, in which the seat front side of the vehicle seat 12 faces toward the vehicle rearward side. Note that FIG. 1 illustrates a state in which the seat front side of the vehicle seat 12, which is used as the driver's seat of the vehicle that can be self-driven, is facing toward the vehicle rearward side. Due thereto, a steering wheel 52 is positioned at the seat rear side of the seatback 24, and a front windshield glass 54 is positioned at the seat upper side of the seatback 24.

Figure 2:
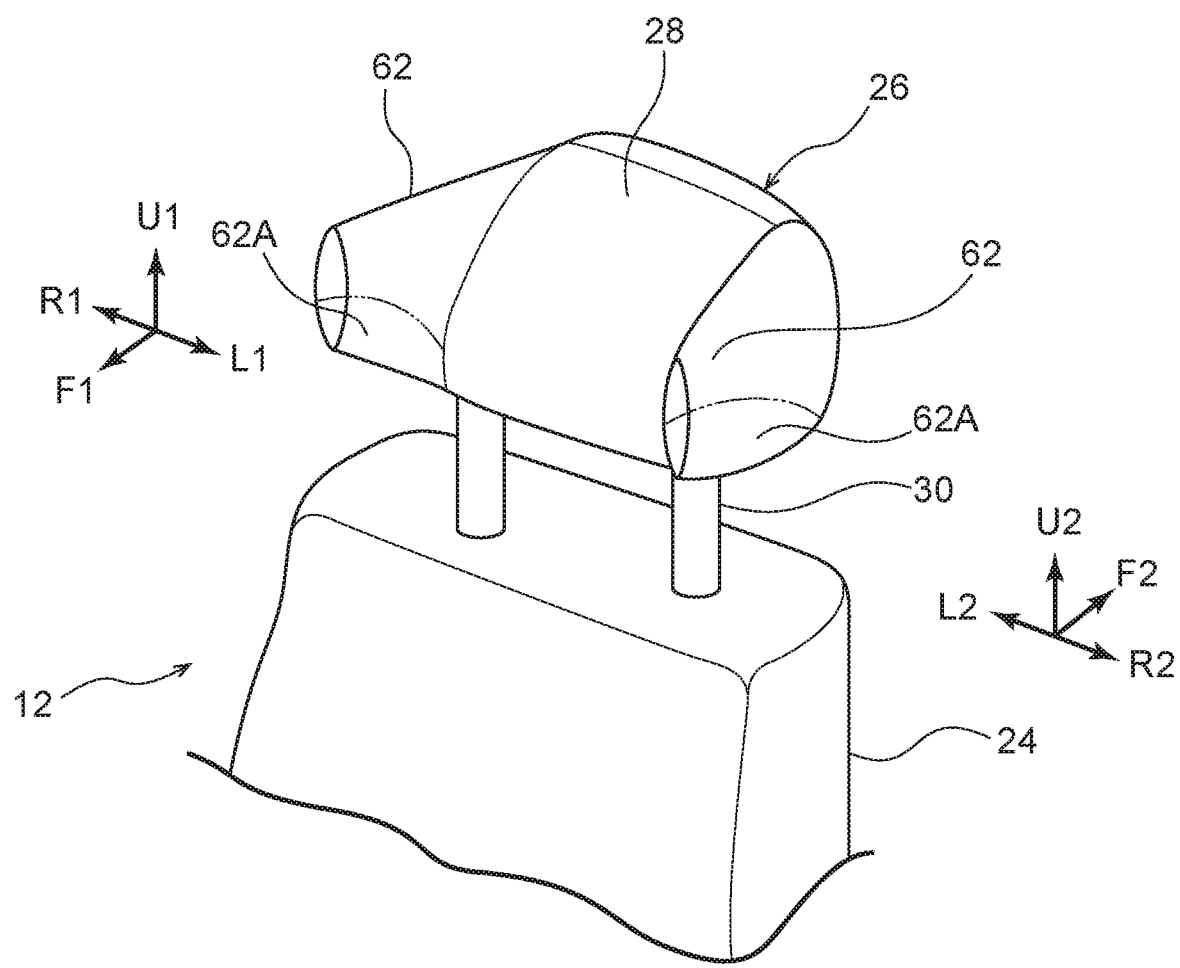
FIG. 2 is a perspective view showing a portion at the upper side of the vehicle seat that is in a state in which shoulder restraining portions are protruded-out.
Figure 3:
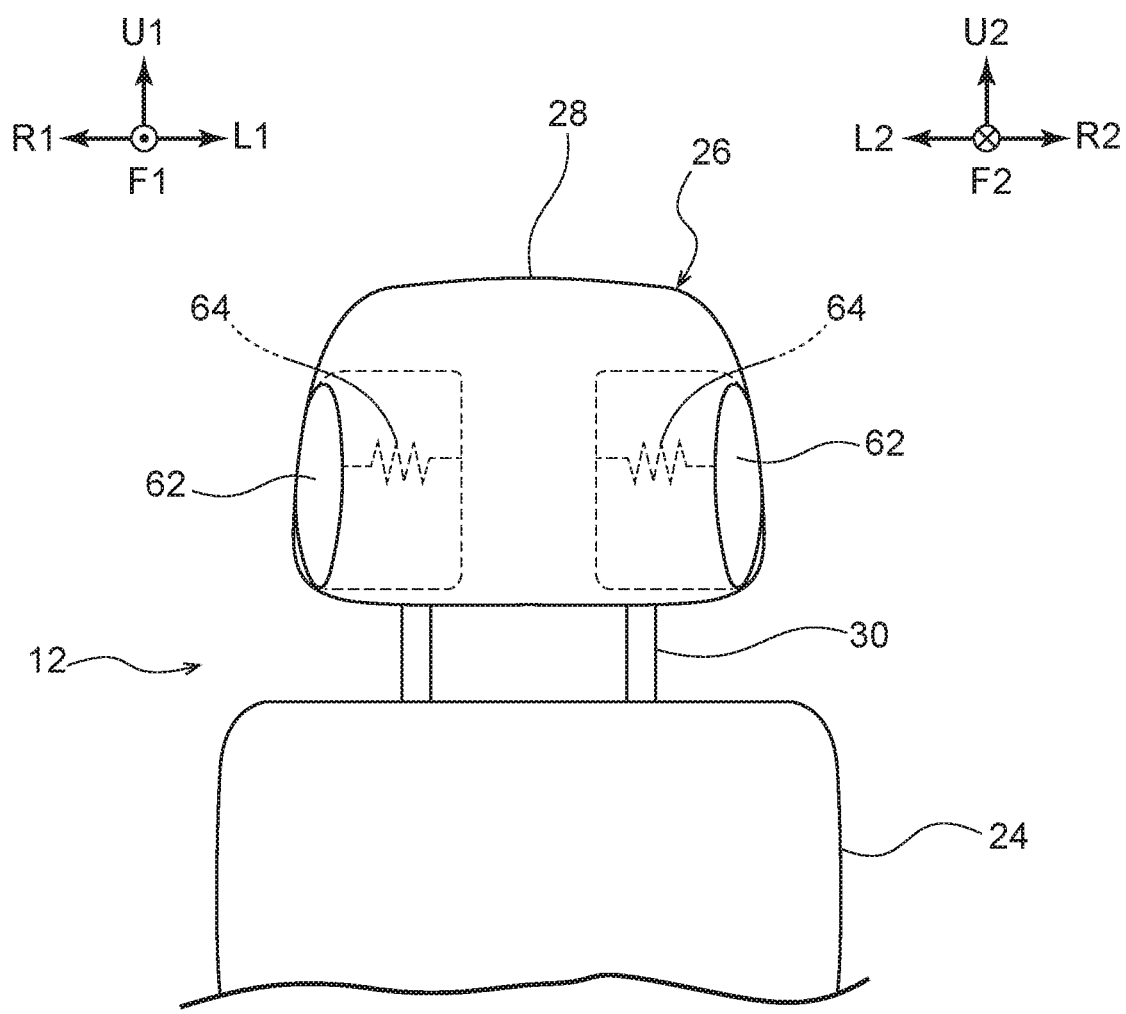
FIG. 3 is a front view showing a portion at the upper side of the vehicle seat that is in a state before the shoulder restraining portions are protruded-out.
Figure 4:
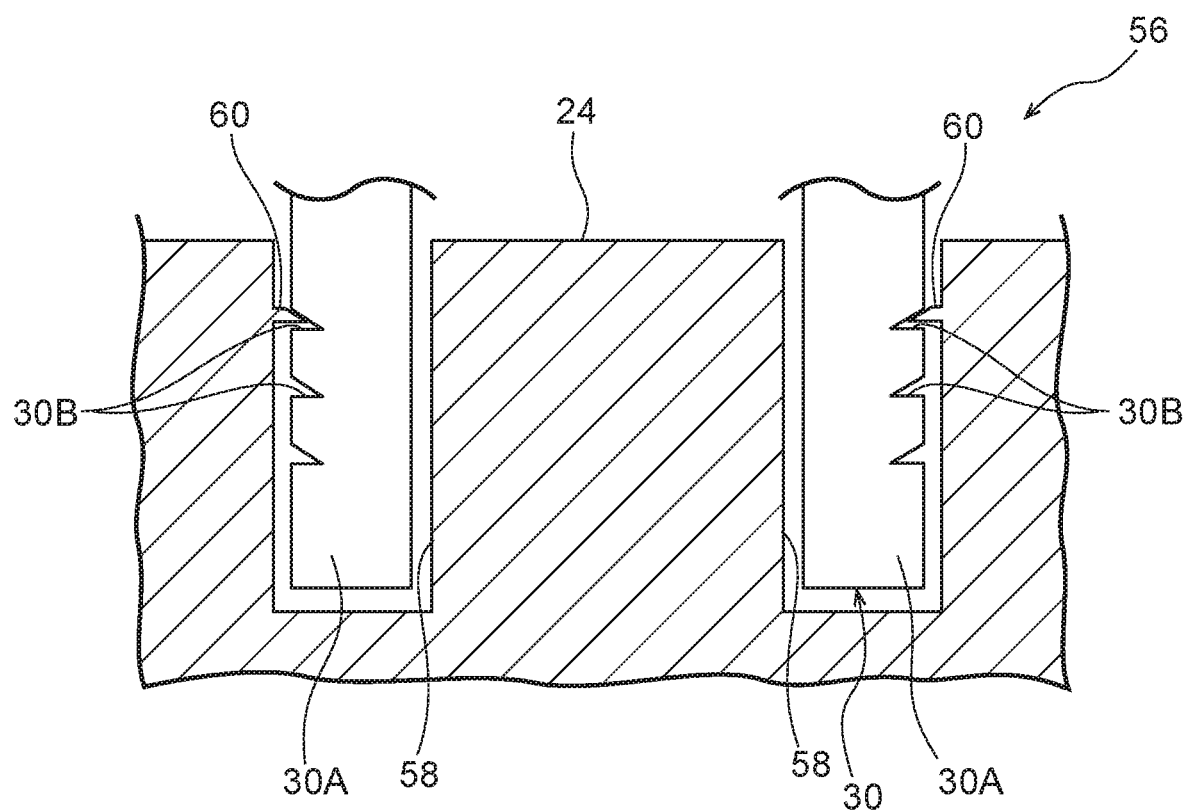
FIG. 4 is an enlarged sectional view showing stay engaging portions that are provided at a seatback, and headrest stays that are engaged with the stay engaging portions.

As shown in FIG. 1 through FIG. 3, the seatback 24 is structured by a seatback pad, which is covered by a skin material in the same way as the seat cushion 22, being mounted to a seatback frame, or the like. The seatback 24 is mounted to the end portion at the seat rear side of the seat cushion 22 so as to be able to tilt in the seat front-rear direction. Further, as shown in FIG. 4, the headrest 26 is held at the upper end portion of the seatback 24 (the end portion that is at the side opposite the seat cushion 22). A holding mechanism 56, which holds the position of the headrest 26 with respect to the seatback 24 at a predetermined position, is provided at the upper end portion of the seatback 24. This holding mechanism 56 is structured to include a pair of insertion holes 58 into which headrest stays 30 that are described later are inserted, and a pair of anchor portions 60 that project-out into the interiors of the pair of insertion holes 58, respectively.

As shown in FIG. 2 and FIG. 3, the headrest 26 is structured by a headrest main body 28, which is structured to include a headrest pad that is covered by a skin material, being mounted to the headrest stays 30, or the like. The headrest stays 30 project-out from the headrest main body 28, and have a pair of insertion portions 30A that are respectively inserted into the above-described pair of insertion holes 58. As shown in FIG. 4, anchoring concave portions 30B, which serve as anchored-on portions and on which the above-described anchor portions 60 anchor, are formed in the insertion portions 30A. In the present embodiment, the plural anchoring concave portions 30B are formed along the length directions of the insertion portions 30A. Further, due to the insertion portions 30A of the headrest stays 30 being inserted into the insertion holes 58, and the anchor portions 60 being anchored on the anchoring concave portions 30B, the position of the headrest 26 (the headrest main body 28) with respect to the seatback 24 is held at a predetermined position. Further, in the present embodiment, at the time when the load, at which both shoulders P5 of the vehicle occupant P who has moved along the seatback 24 toward the headrest 26 side push shoulder restraining portions 62 that are described later, exceeds a predetermined load, the anchor portions 60 come-out from the anchoring concave portions 30B, and the headrest main body 28 moves toward the side opposite the seatback 24.

As shown in FIG. 1, FIG. 2 and FIG. 3, the pair of shoulder restraining portions 62, which restrain the both shoulders P5 of the vehicle occupant P, who has moved along the seatback 24 toward the headrest 26 side, by protruding-out toward the vehicle occupant side at the time of an emergency of the vehicle, are provided at the headrest main body 28. As shown in FIG. 3, the pair of shoulder restraining portions 62 are usually held in a state of being stored in the interior of the headrest main body 28. Further, the pair of shoulder restraining portions 62 are urged in directions of protruding-out toward the vehicle occupant P side by urging members 64. As shown in FIG. 1 and FIG. 2, at the time of an emergency of the vehicle, the pair of shoulder restraining portions 62 are protruded-out toward the vehicle occupant P side respectively from the seat left side and right side of the headrest main body 28, by the urging forces of the urging members 64. Note that the shoulder restraining portions may be made to be the shoulder restraining portions 62 that protrude-out toward the vehicle occupant P side respectively from the seat left side and right side of the headrest main body 28, due to gas being supplied to the interiors of the shoulder restraining portions 62 and the shoulder restraining portions 62 inflating.

Further, in the present embodiment, the pair of shoulder restraining portions 62 deform due to the both shoulders P5 of the vehicle occupant P pushing the pair of shoulder restraining portions 62. Note that, in FIG. 2, the portions, that are deformed by the both shoulders P5 of the vehicle occupant P, at the shoulder restraining portions 62 are illustrated as energy absorbing portions 62A. Further, the contours of some of the portions, which are deformed by the both shoulders P5 of the vehicle occupant P, at the shoulder restraining portions 62 are illustrated by the two-dot chain lines.

Here, in the present embodiment, at the time of a collision of the vehicle (at the time of an emergency of the vehicle), in a case in which there is a high possibility that the vehicle occupant P will move along the seatback 24 toward the headrest 26 side, the pair of shoulder restraining portions 62 protrude-out from the headrest main body 28 toward the vehicle occupant P side. As an example, explanation is given of a case in which there is provided a shoulder restraining portion protruding mechanism 45 that causes the pair of shoulder restraining portions 62 to protrude-out from the headrest main body 28 toward the vehicle occupant P side on the basis of signals from various types of sensors.

As shown in FIG. 1, the shoulder restraining portion protruding mechanism 45 has a seat orientation sensor 46 that detects the direction in which the seat cushion 22 (the vehicle seat 12) is facing, a collision sensor 48 that predicts that the vehicle will be involved in a collision or detects that the vehicle is involved in a collision, and an angle sensor 49 that detects the reclining angle of the seatback 24 with respect to the seat cushion 22. Further, the shoulder restraining portion protruding mechanism 45 has an ECU 50 that, by operating an unillustrated actuator on the basis of signals from the seat orientation sensor 46, the collision sensor 48 and the angle sensor 49, cancels the maintaining of the state in which the pair of shoulder restraining portions 62 are stored in the headrest main body 28.

The seat orientation sensor 46 is a sensor that, by being provided within the rotating mechanism 18, can detect the orientation of the vehicle seat 12. Further, the angle sensor 49 is a sensor that, by being provided at the joined portion of the seat cushion 22 and the seatback 24, can detect the reclining angle of the seatback 24 with respect to the seat cushion 22. As an example, rotary encoders or the like can be used as the seat orientation sensor 46 and the angle sensor 49.

The collision sensor 48 is a sensor that can predict that the vehicle will be involved in a collision, or is a sensor that can detect that the vehicle is involved in a collision. Millimeter wave radar that detects an obstacle or the like at the periphery of the vehicle, an acceleration sensor that detects the deceleration/acceleration of the vehicle, or the like can be used as the collision sensor 48.

The ECU 50 operates the actuator when it is judged that there is a high possibility that the vehicle occupant P will move along the seatback 24 toward the headrest 26 side at the time of a collision of the vehicle.

Operation of the ECU 50 is described next.

On the basis of a signal from the collision sensor 48, the ECU 50 senses whether or not the possibility that the vehicle will become involved in a collision is high, or senses whether or not the vehicle is involved in a collision.

If it is sensed that the possibility that the vehicle will become involved in a collision is high, or that vehicle is involved in a collision, the ECU 50 judges the direction of the collision of the vehicle on the basis of a signal from the collision sensor 48.

When the direction of the collision of the vehicle is judged to be the front side (i.e., when the vehicle is or will be involved in a front collision), on the basis of a signal from the seat orientation sensor 46, the ECU 50 judges whether or not the seat front side of the vehicle seat 12 is facing toward the rearward side of the vehicle. Further, on the basis of a signal from the angle sensor 49, the ECU 50 judges whether or not the seatback 24 is reclined (tilted rearward) past a predetermined angle with respect to the seat cushion 22. Further, if it is judged that the seat front side of the vehicle seat 12 is facing toward the rearward side of the vehicle and that the seatback 24 is in a state of being reclined past a predetermined angle with respect to the seat cushion 22, the ECU 50 judges that there is a high possibility that the vehicle occupant P will move along the seatback 24 toward the headrest 26 side at the time of the collision of the vehicle, and operates the actuator. Due thereto, as shown in FIG. 1, the pair of shoulder restraining portions 62 protrude-out toward the vehicle occupant P side respectively from the seat left side and right side of the headrest main body 28.

On the other hand, if, on the basis of a signal from the collision sensor 48, it is judged that the direction of the collision of the vehicle is the rear side (i.e., that the vehicle is or will be involved in a rear collision), on the basis of a signal from the seat orientation sensor 46, the ECU 50 judges whether or not the seat front side of the vehicle seat 12 is facing toward the frontward side of the vehicle. Further, on the basis of a signal from the angle sensor 49, the ECU 50 judges whether or not the seatback 24 is reclined past a predetermined angle with respect to the seat cushion 22. Further, if it is judged that the seat front side of the vehicle seat 12 is facing toward the frontward side of the vehicle and that the seatback 24 is in a state of being reclined past a predetermined angle with respect to the seat cushion 22, the ECU 50 judges that there is a high possibility that the vehicle occupant P will move along the seatback 24 toward the headrest 26 side at the time of the collision of the vehicle, and operates the actuator. Due thereto, as shown in FIG. 1, the pair of shoulder restraining portions 62 protrude-out toward the vehicle occupant P side respectively from the seat left side and right side of the headrest main body 28.

(Operation and Effects of Present Embodiment)
Operation and effects of the present embodiment are described next.

As shown in FIG. 1, in the state in which the vehicle occupant P is seated on the seat cushion 22, the buttocks P1 and the femoral regions P2 of the vehicle occupant P are supported by the seat cushion 22, and the upper body P3 of the vehicle occupant is supported by the seatback 24. At this time, the vehicle occupant P can sit in a comfortable posture in the vehicle seat 12 by tilting the seatback 24 toward the seat rear side with respect to the seat cushion 22. Note that FIG. 1 illustrates a state in which the vehicle occupant P is seated in the vehicle seat 12 in a comfortable posture.

Here, in the present embodiment, at the time when the ECU 50 judges that there is a high possibility that the vehicle occupant P will move along the seatback 24 toward the headrest 26 side at the time of a collision of the vehicle, the ECU 50 operates the actuator, and the pair of shoulder restraining portions 62 protrude-out toward the vehicle occupant P side respectively from the seat left side and right side of the headrest main body 28. Due thereto, the both shoulders P5 of the vehicle occupant P, who has moved along the seatback 24 toward the headrest 26 side at the time of a collision of the vehicle, are restrained by the pair of shoulder restraining portions 62. As a result, in the present embodiment, in a rear collision in a case in which the seat front side of the vehicle seat 12 is facing toward the vehicle frontward side, or in a front collision in a case in which the seat front side of the vehicle seat 12 is facing toward the vehicle rearward side, the upper body P3 of the vehicle occupant P who is seated in the vehicle seat 12 riding-up along the seatback 24 at the time of the collision can be prevented or suppressed.

Further, as shown in FIG. 1, FIG. 2 and FIG. 4, in the present embodiment, when the both shoulders P5 of the vehicle occupant P who has moved along the seatback 24 toward the headrest 26 side push the shoulder restraining portions 62, portions (the energy absorbing portions 62A) of the shoulder restraining portions 62 deform. Further, at the time when the load, at which the both shoulders P5 of the vehicle occupant P who has moved along the seatback 24 toward the headrest 26 side push the shoulder restraining portions 62, exceeds a predetermined load, the anchor portions 60 that structure portions of the holding mechanism 56 come-out from the anchoring concave portions 30B of the headrest stays 30, and the headrest main body 28 moves toward the side opposite the seatback 24. Due thereto, the contact pressure of the both shoulders P5 of the vehicle occupant P and the pair of shoulder restraining portions 62 increasing can be suppressed.

Note that, in the present embodiment, in a front collision in a case in which the seat front side of the vehicle seat 12 is facing toward the vehicle rearward side (the vehicle occupant is facing rearward), or in a rear collision in a case in which the seat front side of the vehicle seat 12 is facing toward the vehicle frontward side (the vehicle occupant is facing forward), the actuator is operated so as to be able to prevent or suppress the riding-up, along the seatback 24 at the time of a collision, of the upper body P3 of the vehicle occupant P who is seated in the vehicle seat 12. However, the present disclosure is not limited to this. For example, in a case in which the seat front side of the vehicle seat 12 is facing toward a vehicle lateral side, the actuator may be operated so as to able to prevent or suppress the riding-up, along the seatback 24 at the time of a collision, of the upper body P3 of the vehicle occupant P who is seated in the vehicle seat 12.

Further, in the present embodiment, an example is described in which the pair of shoulder restraining portions 62 are protruded-out from the headrest main body 28 by an electric mechanism that uses the ECU 50 and the actuator and the like. However, the present disclosure is not limited to this. For example, the pair of shoulder restraining portions 62 may be protruded-out from the headrest main body 28 by a mechanical mechanism, in a case in which there is a high possibility that the vehicle occupant P will move along the seatback 24 toward the headrest 26 side at the time of a vehicle collision. Further, there may be a structure in which the pair of shoulder restraining portions 62 always protrude-out from the headrest main body 28 in a state in which the seat front side of the vehicle seat 12 is facing toward the vehicle rearward side (the vehicle occupant is facing rearward), or when the seatback 24 is in a comfortable posture of being tilted rearward past a predetermined angle. Moreover, there may be a structure in which the pair of shoulder restraining portions 62 always protrude-out from the headrest main body 28 at the time of a collision of the vehicle.

Further, the present embodiment describes an example in which, due to the anchor portions 60 that structure portions of the holding mechanism 56 coming-out from the anchoring concave portions 30B of the headrest stays 30, the headrest main body 28 moves toward the side opposite the seatback 24, and the contact pressure of the both shoulders P5 of the vehicle occupant P and the pair of shoulder restraining portions 62 increasing is suppressed. However, the present disclosure is not limited to this. For example, in the case of employing a structure in which the shoulder restraining portions 62 protrude-out from the headrest 26 side of the seatback 24, there may be a structure in which only the shoulder restraining portions 62 move at the time when the load, at which the both shoulders P5 of the vehicle occupant P push the shoulder restraining portions 62, exceeds a predetermined load.

Although an embodiment of the present disclosure has been described, the present disclosure is not limited to the above, and can, of course, be implemented by being modified in various ways other than the above within a scope that does not depart from the gist thereof.

An object of the present disclosure is to provide a vehicle seat structure that can prevent or suppress the upper body of a vehicle occupant, who is seated in a vehicle seat, riding-up along a seatback at the time of a collision, regardless of the orientation of the seat.

A vehicle seat structure of a first aspect of the present disclosure includes: a seat cushion that can support buttocks and femoral regions of a vehicle occupant; a rotating mechanism that supports the seat cushion such that the seat cushion can rotate with a vehicle vertical direction as an axis; a seatback that is provided at a seat rear side of the seat cushion so as to be able to tilt in a seat front-rear direction with respect to the seat cushion, and that can support an upper body of the vehicle occupant; a headrest that is provided at a side of the seatback, which side is opposite from a side at which the seat cushion is located, and that can support a head portion of the vehicle occupant; and shoulder restraining portions that are provided at the headrest or at the headrest side of the seatback, and that, by protruding out toward a vehicle occupant side at a time of an emergency of a vehicle, restrain both shoulders of the vehicle occupant in a case in which the vehicle occupant has moved along the seatback toward the headrest side.

In accordance with the vehicle seat structure of the first aspect of the present disclosure, in the state in which the vehicle occupant is seated on the seat cushion, the buttocks and the femoral regions of the vehicle occupant are supported by the seat cushion. Further, the upper body and the head portion of the vehicle occupant are supported by the seatback and the headrest respectively. Further, when the seat cushion rotates by the rotating mechanism, the orientation of the seat cushion changes. Namely, the orientation of the seat changes. Moreover, at the time of an emergency of the vehicle, the shoulder restraining portions protrude-out toward the vehicle occupant side. In the state in which the shoulder restraining portions are protruded-out toward the vehicle occupant side, the both shoulders of the vehicle occupant, who has moved along the seatback toward the headrest side, are restrained by the shoulder restraining portions. Due thereto, the upper body of the vehicle occupant riding-up along the seatback at the time of a collision can be prevented or suppressed, regardless of the orientation of the seat.

A vehicle seat structure of a second aspect of the present disclosure is the vehicle seat structure of the first aspect, wherein the shoulder restraining portions protrude out toward the vehicle occupant side in a case in which the vehicle is involved in a front collision, in a state in which a seat forward direction of the seat cushion faces toward a rearward direction of the vehicle, or in a case in which the vehicle is involved in a rear collision in a state in which the seat forward direction of the seat cushion faces toward a frontward direction of the vehicle.

In accordance with the vehicle seat structure of the second aspect of the present disclosure, when the vehicle is involved in a front collision in a state in which the seat forward direction of the seat cushion is facing toward the rearward direction of the vehicle, the upper body of the vehicle occupant riding-up along the seatback at the time of the front collision can be prevented or suppressed due to the shoulder restraining portions protruding-out toward the vehicle occupant side. Further, when the vehicle is involved in a rear collision in a state in which the seat forward direction of the seat cushion is facing toward the frontward direction of the vehicle, the upper body of the vehicle occupant riding-up along the seatback at the time of the rear collision can be prevented or suppressed due to the shoulder restraining portions protruding-out toward the vehicle occupant side.

A vehicle seat structure of a third aspect of the present disclosure is the vehicle seat structure of the first or second aspect, wherein the shoulder restraining portions move in a case in which a load, with which the shoulder restraining portions are pushed by both shoulders of the vehicle occupant, exceeds a predetermined load.

In accordance with the vehicle seat structure of the third aspect of the present disclosure, the shoulder restraining portions move at the time when the load, at which the shoulder restraining portions are pushed by the both shoulders of the vehicle occupant, exceeds a predetermined load. Due thereto, the contact pressure of the both shoulders of the vehicle occupant and the shoulder restraining portions increasing can be suppressed.

A vehicle seat structure of a fourth aspect of the present disclosure is the vehicle seat structure of the third aspect, wherein: the shoulder restraining portions are provided at the headrest, the vehicle seat structure further comprises a holding mechanism that holds a position of the headrest with respect to the seatback at a predetermined position, and holding of the headrest by the holding mechanism is released in a case in which the load, with which the shoulder restraining portions are pushed by both shoulders of the vehicle occupant, exceeds a predetermined load.

In accordance with the vehicle seat structure of the fourth aspect of the present disclosure, at the time when the load, at which the shoulder restraining portions are pushed by the both shoulders of the vehicle occupant, exceeds a predetermined load, the holding of the headrest by the holding mechanism is released, and the shoulder restraining portions move together with the headrest. Due thereto, the contact pressure of the both shoulders of the vehicle occupant and the shoulder restraining portions increasing can be suppressed.

A vehicle seat structure of a fifth aspect of the present disclosure is the vehicle seat structure of the fourth aspect, wherein: the holding mechanism is structured to include anchor portions, the headrest is structured to include headrest stays that have anchored-on portions on which the anchor portions anchor, and in a case in which the load, with which the shoulder restraining portions are pushed by both shoulders of the vehicle occupant, exceeds a predetermined load, the anchor portions come out from the anchored-on portions, and holding of the headrest by the holding mechanism is released.

In accordance with the vehicle seat structure of the fifth aspect of the present disclosure, at the time when the load, at which the shoulder restraining portions are pushed by the both shoulders of the vehicle occupant, exceeds a predetermined load, the anchor portions of the holding mechanism come-out from the anchored-on portions of the headrest stays. Due thereto, the holding of the headrest by the holding mechanism is released, and the shoulder restraining portions move together with the headrest. As a result, the contact pressure of the both shoulders of the vehicle occupant and the shoulder restraining portions increasing can be suppressed.

A vehicle seat structure of a sixth aspect of the present disclosure is the vehicle seat structure of any one of the first through fifth aspects, wherein energy absorbing portions, which deform by being pushed by both shoulders of the vehicle occupant, are provided at the shoulder restraining portions.

In accordance with the vehicle seat structure of the sixth aspect of the present disclosure, the energy absorbing portions deform when the both shoulders of the vehicle occupant push the shoulder restraining portions. Due thereto, the contact pressure of the both shoulders of the vehicle occupant and the shoulder restraining portions increasing can be suppressed.

The vehicle seat structure relating to the present disclosure has the excellent effect of being able to prevent or suppress the upper body of a vehicle occupant, who is seated in a vehicle seat, riding-up along a seatback at the time of a collision, regardless of the orientation of the seat.

What is claimed is:

1. A vehicle seat structure comprising:
a seat cushion configured to support buttocks and femoral regions of a vehicle occupant;
a rotating mechanism that supports the seat cushion such that the seat cushion is rotatable about a vertical axis;
a seatback that is provided at a seat rear side of the seat cushion so as to be tiltable in a seat front-rear direction with respect to the seat cushion, and that is configured to support an upper body of the vehicle occupant;
a headrest that is provided at a top side of the seatback, which top side is opposite from a bottom side of the seatback at which the seat cushion is located, and that is configured to support a head portion of the vehicle occupant;
shoulder restraining portions that are provided at the headrest or at the top side of the seatback, and that are configured to protrude out toward a vehicle occupant side at a time of an emergency of a vehicle, to restrain both shoulders of the vehicle occupant by contacting both of the shoulders of the vehicle occupant in a case in which the vehicle occupant has moved along the seatback toward the top side of the seatback; and
an electronic control unit configured to control deployment of the shoulder restraining portions to cause the shoulder restraining portions to protrude out toward the vehicle occupant side (i) in a case in which the vehicle is involved in a front collision while in a state in which a seat forward end of the seat cushion faces toward a rearward direction of the vehicle, and (ii) in a case in which the vehicle is involved in a rear collision while in a state in which the seat forward end of the seat cushion faces toward a frontward direction of the vehicle,
wherein the electronic control unit does not cause the shoulder restraining portions to protrude out toward the vehicle occupant side (iii) in a case in which the vehicle is involved in the front collision while in the state in which the seat forward end of the seat cushion faces toward the frontward direction of the vehicle, and (iv) in a case in which the vehicle is involved in the rear collision while in the state in which the seat forward end of the seat cushion faces toward the rearward direction of the vehicle.

2. The vehicle seat structure of claim 1, wherein the electronic control unit causes the shoulder restraining portions to protrude out toward the vehicle occupant side (ia) in the case in which the vehicle is involved in the front collision while in the state in which the seat forward end of the seat cushion faces toward the rearward direction of the vehicle and the seatback is reclined past a predetermined angle, and (iia) in the case in which the vehicle is involved in the rear collision while in the state in which the seat forward end of the seat cushion faces toward the frontward direction of the vehicle and the seatback is reclined past the predetermined angle.

3. The vehicle seat structure of claim 1, wherein the shoulder restraining portions move in a case in which a load, with which the shoulder restraining portions are pushed toward the headrest at the time of the emergency, exceeds a predetermined load.

4. The vehicle seat structure of claim 3, wherein:
the shoulder restraining portions are provided at the headrest,
the vehicle seat structure further comprises a holding mechanism that holds a position of the headrest with respect to the seatback at a predetermined position, and
holding of the headrest by the holding mechanism is released in the case in which the load, with which the shoulder restraining portions are pushed toward the headrest at the time of the emergency, exceeds the predetermined load.

5. The vehicle seat structure of claim 4, wherein:
the holding mechanism includes anchor portions,
the headrest includes headrest stays that have anchored-on portions on which the anchor portions anchor, and
in the case in which the load, with which the shoulder restraining portions are pushed toward the headrest at the time of the emergency, exceeds the predetermined load, the anchor portions come out from the anchored-on portions, and holding of the headrest by the holding mechanism is released.

6. The vehicle seat structure of claim 1, wherein energy absorbing portions, which deform by being pushed toward the headrest at the time of the emergency, are provided at the shoulder restraining portions.

7. A vehicle seat control method of controlling a vehicle seat structure that includes (i) a seat cushion configured to support buttocks and femoral regions of a vehicle occupant; (ii) a rotating mechanism that supports the seat cushion such that the seat cushion is rotatable about a vertical axis; (iii) a seatback that is provided at a seat rear side of the seat cushion so as to be tiltable in a seat front-rear direction with respect to the seat cushion, and that is configured to support an upper body of the vehicle occupant; (iv) a headrest that is provided at a top side of the seatback, which top side is opposite from a bottom side of the seatback at which the seat cushion is located, and that is configured to support a head portion of the vehicle occupant; and (v) shoulder restraining portions that are provided at the headrest or at the top side of the seatback, and that are configured to protrude out toward a vehicle occupant side at a time of an emergency of a vehicle, to restrain both shoulders of the vehicle occupant by contacting both of the shoulders of the vehicle occupant in a case in which the vehicle occupant has moved along the seatback toward the top side of the seatback, the method executed by an electronic control unit and comprising:
when it is determined by the electronic control unit that the vehicle is involved in a front collision,
determining, by the electronic control unit, whether or not a seat forward end of the seat cushion faces toward a rearward direction of the vehicle;

determining, by the electronic control unit, whether or not the seat back is tilted rearward beyond a predetermined angle with respect to the seat cushion; and when it has been determined by the electronic control unit that the seat forward end of the seat cushion faces toward the rearward direction of the vehicle and that the seat back is tilted rearward beyond the predetermined angle with respect to the seat cushion, activating, by the electronic control unit, an actuator to deploy the shoulder restraining portions to cause the shoulder restraining portions to protrude out toward the vehicle occupant side.

8. A vehicle seat control method of controlling a vehicle seat structure that includes (i) a seat cushion configured to support buttocks and femoral regions of a vehicle occupant; (ii) a rotating mechanism that supports the seat cushion such that the seat cushion is rotatable about a vertical axis; (iii) a seatback that is provided at a seat rear side of the seat cushion so as to be tiltable in a seat front-rear direction with respect to the seat cushion, and that is configured to support an upper body of the vehicle occupant; (iv) a headrest that is provided at a top side of the seatback, which top side is opposite from a bottom side of the seatback at which the seat cushion is located, and that is configured to support a head portion of the vehicle occupant; and (v) shoulder restraining portions that are provided at the headrest or at the top side of the seatback, and that are configured to protrude out toward a vehicle occupant side at a time of an emergency of a vehicle, to restrain both shoulders of the vehicle occupant by contacting both of the shoulders of the vehicle occupant in a case in which the vehicle occupant has moved along the seatback toward the top side of the seatback, the method executed by an electronic control unit and comprising:

when it is determined by the electronic control unit that the vehicle is involved in a rear collision, determining, by the electronic control unit, whether or not a seat forward end of the seat cushion faces toward a frontward direction of the vehicle;

determining, by the electronic control unit, whether or not the seat back is tilted rearward beyond a predetermined angle with respect to the seat cushion; and when it has been determined by the electronic control unit that the seat forward end of the seat cushion faces toward the frontward direction of the vehicle and that the seat back is tilted rearward beyond the predetermined angle with respect to the seat cushion, activating, by the electronic control unit, an actuator to deploy the shoulder restraining portions to cause the shoulder restraining portions to protrude out toward the vehicle occupant side.

\* \* \* \* \*